(12) United States Patent
Komatsu et al.

(10) Patent No.: US 8,309,010 B2
(45) Date of Patent: Nov. 13, 2012

(54) PROCESS FOR PRODUCTION OF HEAT-RESISTANT HOLLOW ARTICLE MADE OF POLYLACTIC ACID CONTAINING RESIN

(76) Inventors: Michio Komatsu, Iwaki (JP); Toshikatsu Matsuoka, Tokyo (JP)

( * ) Notice: Subject to any disclaimer, the term of this patent is extended or adjusted under 35 U.S.C. 154(b) by 170 days.

(21) Appl. No.: 12/709,430

(22) Filed: Feb. 19, 2010

(65) Prior Publication Data

US 2010/0148387 A1 Jun. 17, 2010

Related U.S. Application Data

(63) Continuation-in-part of application No. 11/814,370, filed on Jul. 20, 2007, now abandoned.

(30) Foreign Application Priority Data

Jan. 26, 2005 (JP) .................. 2005-017584

(51) Int. Cl.
*B29B 7/00* (2006.01)
*B29C 45/00* (2006.01)
*B28B 17/00* (2006.01)
*B29B 13/00* (2006.01)

(52) U.S. Cl. ............. 264/328.16; 264/40.1; 264/40.6; 264/319; 264/328.1; 264/328.14; 264/334; 425/139; 425/143; 425/144; 425/556

(58) Field of Classification Search ........... 264/328.1, 264/328.14, 328.16, 328.17, 40.1, 40.6, 319, 264/334; 425/139, 143, 144, 556
See application file for complete search history.

(56) References Cited

U.S. PATENT DOCUMENTS

| | | | |
|---|---|---|---|
| 4,844,847 A | 7/1989 | Harada | |
| 4,935,187 A | 6/1990 | Vente et al. | |
| 6,606,114 B1 | 8/2003 | Gordon et al. | |
| 2003/0166779 A1* | 9/2003 | Khemani et al. | ............ 525/178 |
| 2004/0119203 A1 | 6/2004 | Keirstead et al. | |
| 2004/0157967 A1* | 8/2004 | Ito | ............ 524/109 |
| 2004/0214983 A1 | 10/2004 | Tobita et al. | |
| 2005/0043462 A1 | 2/2005 | Yamada et al. | |

FOREIGN PATENT DOCUMENTS

DE 297 08 297 7/1997

(Continued)

OTHER PUBLICATIONS

Machine Translation of JP 2004-204143.*

*Primary Examiner* — Christina Johnson
*Assistant Examiner* — Atul P. Khare
(74) *Attorney, Agent, or Firm* — Paul A. Guss (57) ABSTRACT

A process for production of a heat-resistant hollow article made of a polylactic acid containing resin by using a mold which includes a female mold portion having a concavity, a male mold portion having a convexity and a stripper plate having an edge-forming part. The surface of the mold facing the cavity is heated to a temperature corresponding to a crystallization temperature of the polylactic acid containing resin. The male mold portion and the stripper plate are moved away from the female mold portion when a temperature T(° C.) of the resin detected by an infrared temperature sensor is in the range of T=(t+3.5)±1.5 (t(° C.) is the surface temperature of the mold). Gas is introduced between an inner surface of the hollow article and the male mold portion, and the hollow article is taken out of the mold by advancing the stripper plate toward the hollow article.

6 Claims, 6 Drawing Sheets

FOREIGN PATENT DOCUMENTS

| | | |
|---|---|---|
| EP | 1 460 107 | 9/2004 |
| JP | 1-146719 | 6/1989 |
| JP | 11-333858 | 12/1999 |
| JP | 2004-204143 | 7/2004 |
| JP | 2004-277706 | 10/2004 |
| WO | 03/022927 | 3/2003 |

* cited by examiner

PROCESS FOR PRODUCTION OF HEAT-RESISTANT HOLLOW ARTICLE MADE OF POLYLACTIC ACID CONTAINING RESIN

BACKGROUND OF THE INVENTION

1. Field of the Invention

The present invention relates to a process for production of a heat-resistant hollow article made of a polylactic acid containing resin.

2. Description of the Related Art

In recent years, the use of food containers, such as bowls, cups and trays, which are made of biodegradable resin, has been investigated in restaurants, cafeterias and the like. Because the food containers which are made of biodegradable resin are degraded by the action of microorganisms in soil and the like after being discarded, it is possible to reduce the burden to the environment.

Hitherto, polylactic acid has been known as the above-described biodegradable resin. However, the polylactic acid has low heat resistance. Therefore, when the polylactic acid is used to make food containers, this poses the problems that the food containers cannot withstand hot water, heating by a microwave oven, washing and rinsing at temperatures around 70° C. in an alkali detergent for recycle after use, and high-temperature drying and sterilization treatment at temperatures around 80° C.

There are known biodegradable resin compositions that contain not less than 50% polylactic acid by mass and are nanocomposites of an inorganic filler as biodegradable resin compositions to solve the above-described problem (refer to Japanese Patent Laid-Open No. 2004-204143, for example). Excellent heat resistance can be imparted to the above-described biodegradable resin compositions by crystallization at temperatures near 110° C., and the above-described food containers can be formed by injection molding without being stretched.

In forming a hollow article such as the above-described food containers by injection-molding the biodegradable resin composition, for example, a mold that comprises a female mold portion having a concavity of a shape fitting the outer shape of the hollow article and a male mold portion having a convexity fitting the inner shape of the hollow article and opposed to the concavity, is heated to 110° C., for example, and the biodegradable resin composition in a molten state is injected into a cavity enclosed by the concavity and the convexity. And after the injected biodegradable resin composition is solidified to form the hollow article, the mold is opened to take out the hollow article.

However, it is likely that when an injection-molded product formed from the above-described biodegradable resin composition is taken out of the mold in an insufficiently cooled condition, it may be deformed because of insufficient rigidity and the shape of the injection-molded article may be deteriorated.

Also, an injection-molded product formed from the above-described biodegradable resin composition contracts if excessively cooled during solidification and tends to adhere to the above-described male mold portion, and during the opening of the mold, there may sometimes be a case where the injection-molded product cannot be easily released from the male mold portion, though it can be easily released from the female mold portion. Particularly, in the case where a hollow article such as a bowl or the like is formed through injection molding, it would be very difficult to release the injection-molded product from the mold if it is completely solidified.

Due to the above-mentioned problems, presently only articles such as a spoon, a fork and the like with low concavity or convexity can be produced through injection-molding from the biodegradable resin composition mentioned above. In order to solve the problem of the difficulty for releasing the mold caused by the strong contraction force, most of the polylactic acid-containing resins being currently distributed in the market are polymer-alloyed (for example, polylactic acid 40% and polycarbonate 60% by mass, or polylactic acid 50% and ABS 50% by mass, or the like). However, such polymer-alloyed polylactic acid containing resin contains a large amount of synthetic resin derived from petroleum oil and the synthetic resin is not biodegradable, and consequently causing a big problem to the environment.

SUMMARY OF THE INVENTION

The present invention has been accomplished in view of the aforementioned problems, and it is therefore an object of the present invention to provide a process for production of a heat-resistant hollow article that by injection-molding polylactic acid containing resin with a nanocomposite inorganic filler.

To achieve the above object, the present invention provides a process for production of a heat-resistant hollow article made of a polylactic acid containing resin molded by injecting the polylactic acid containing resin into a mold, wherein the polylactic acid containing resin is a biodegradable resin composition that contains not less than 50% polylactic acid by mass and 1~28% nanocomposite inorganic filler by mass; and the mold comprises a female mold portion having a concavity of a shape fitting an outer surface of the hollow article, a male mold portion having a convexity fitting an inner surface of the hollow article and opposed to the concavity, and a stripper plate having an edge-forming part which is arranged along the periphery of the male mold portion and has a shape fitting an edge of the hollow article, and the mold is configured to form a cavity enclosed by the concavity, the convexity and the edge-forming part. The process comprising the steps of: heating the surface of the mold facing the cavity to a temperature in the range of 110 to 120° C. which is corresponding to a crystallization temperature of the polylactic acid containing resin; injecting the polylactic acid containing resin in a molten state into the cavity of the mold heated to the crystallization temperature via a gate disposed in the mold; moving the male mold portion and the stripper plate away from the female mold portion when a temperature T(° C.) of the polylactic acid containing resin injected into the cavity which is detected by an infrared temperature sensor provided in a position which is housed in the convexity of the male mold portion or in the concavity of the female mold portion and is facing the cavity is in a range expressed by T=(t+3.5)±1.5 (where t(° C.) is the surface temperature of the mold facing the cavity); releasing the inner surface of the hollow article from the convexity of the male mold portion by injecting and introducing compressed air through a compressed air induction passage formed between the male mold portion and the stripper plate into between the inner surface of the solidified hollow article and the convexity of the male mold portion; and taking out the hollow article from the mold by advancing the stripper plate toward the hollow article.

The mold used in the production process of the present invention comprises a female mold portion having a concavity of a shape fitting the outer surface of the hollow article, a male mold portion which has a convexity fitting the inner surface of the hollow article and is opposed to the concavity, and a stripper plate having an edge-forming part which is arranged along the periphery of the male mold portion and has a shape fitting an edge of the hollow article. The mold forms a cavity enclosed by the concavity, the convexity and the edge-forming part.

In the present specification, the term "hollow article" means an injection-molded product that comprises a bottom portion and a peripheral wall portion that is continuous with the bottom portion and rises from the bottom portion. Examples of such a hollow article include tableware, such as bowls and cups, cosmetic containers, such as lipstick containers, chemicals containers, caps of containers, beverage bottles (except PET bottles formed by blow molding), sealable containers, such as Tupperware (registered trademark), food packing containers for microwave oven, and heat-resistant containers for electronic device.

According to the production process of the present invention, first, the mold is heated until the surface of the mold facing the cavity to a temperature is in the range of 110 to 120° C. which is corresponding to a crystallization temperature of the polylactic acid containing resin. The polylactic acid containing resin begins to crystallize at a temperature around 125° C., and the peak temperature for crystallization is 110° C.

According to the production process of the present invention, the polylactic acid containing resin is a biodegradable resin composition which contains not less than 50% polylactic acid by mass and 1~28% nanocomposite inorganic filler by mass.

It is desirable that the inorganic filler is a laminated silicate having an average layer thickness from 1 to 100 nm and a major length not greater than 150 nm. Since the laminated silicate is originated from clay containing polylactic acids arranged in matrix which can be biodegraded, it will cause almost no problem to the environment. Moreover, it is desirable that the polylactic acid containing resin contains 1~28% nanocomposite inorganic filler by mass and the left part thereof is substantially polylactic acid.

Next, the polylactic acid containing resin in a molten state is injected into the cavity with the surface thereof heated to the crystallization temperature. The polylactic acid containing resin is solidified after cooled in the cavity, whereby the hollow article is formed. At this time, the polylactic acid containing resin crystallizes when the temperature of the polylactic acid containing resin is maintained at the surface temperature of the mold to give heat resistance to the polylactic acid containing resin.

After the injected polylactic acid containing resin has been solidified to form the hollow article, the mold is opened by moving the male mold portion and the stripper plate away from the female mold portion. Herein, the time required for the polylactic acid containing resin to be cooled in the cavity for solidification differentiates from the surface temperature of the mold.

Thereby, the inventors of the present invention have been dedicated to experiments on the relationship between the surface temperature of the mold and the temperature of the polylactic acid containing resin where the polylactic acid containing resin solidifies and can be released from the mold. According to the experimental results, it is found that when the temperature of the polylactic acid containing resin is in a predefined range around a reference temperature which is obtained by adding a predefined value to the surface temperature of the mold, the polylactic acid containing resin solidifies and can be released from the mold.

In other words, according to the production process of the present invention, when the temperature T(° C.) of the polylactic acid containing resin in the cavity is in the range expressed by $T=(t+3.5)\pm1.5$ (where $t$(° C.) is the surface temperature of the mold facing the cavity), it can be determined that the polylactic acid containing resin has become solidified, the hollow article has been formed and can be released from the mold. Specifically, when the surface temperature of the mold is 120° C., the temperature T of the polylactic acid containing resin serving as a determination base is 123.5±1.5° C.; when the surface temperature of the mold is 110° C., the temperature T of the polylactic acid containing resin is 113.5±1.5° C. Thereby, the temperature T of the polylactic acid containing resin is in the temperature range of 125 to 112° C. where the polylactic acid containing resin has become solidified, the hollow article has been formed and can be released from the mold.

As mentioned above, the polylactic acid containing resin begins to crystallize at a temperature around 125° C. When the temperature T of the polylactic acid containing resin is higher than 125° C., the polylactic acid containing resin is not solidified and the hollow article has not been formed. The peak temperature for the polylactic acid containing resin to crystallize is 110° C., therefore, if the temperature T of the polylactic acid containing resin is lower than 112° C., the crystallization will advance excessively, which makes it difficult to release the hollow article from the male mold portion.

Thus, according to the production process of the present invention, it is desirable that the surface temperature of the mold is heated to 110° C. which is the peak temperature for the polylactic acid containing resin to crystallize. Herein, the temperature T of the polylactic acid containing resin serving as the determination base is 113.5±1.5° C., namely, in the range of 115 to 112° C.

According to the production process of the present invention, the solidification of the polylactic acid containing resin and the formation of the hollow article are determined by detecting the temperature of the polylactic acid containing resin injected into the cavity by use of an infrared temperature sensor disposed at a position facing the cavity.

According to the production process of the present invention, the mold is opened when the temperature T of the polylactic acid containing resin falls in the aforementioned range.

At this time, the hollow article, though can be released from the mold, adheres to the male mold portion due to the contraction associated with the solidification of the polylactic acid containing resin. Although the hollow article can be easily released from the female mold portion, it cannot be easily released from the male mold portion. Therefore, after the mold is opened by moving the male mold portion and the stripper plate away from the female mold portion, compressed gas is ejected through a compressed gas introduction passage disposed between the male mold portion and the stripper plate into between the inner surface of the solidified hollow article and the convexity of the male mold portion. Thus, by introducing the compressed gas into between the surface of the hollow article and the convexity, the inner surface of the hollow article can be released from the convexity of the male mold portion.

Next, when the hollow article has been released from the convexity of the male mold portion, the hollow article is taken out of the mold by advancing the stripper plate toward the hollow article.

According to the production process of the present invention, the solidification of the polylactic acid containing resin and the formation of the hollow article are determined through directly detecting the temperature of the polylactic acid containing resin injected into the cavity by use of the infrared temperature sensor. Therefore, it is possible to detect the temperature of the polylactic acid containing resin with high accuracy without being affected by the environment, such as the outside air temperature. As shown by the aforementioned expression, it is possible to open the mold when the temperature T of the polylactic acid containing resin falls in a narrow temperature range of 125 to 112° C.

As a result thereof, according to the production process of the present invention, it is possible to manufacture the hollow article without the deformation of the hollow article or the incapability of being taken out from the mold in the release of the hollow article from the mold. Because the hollow article obtained as described above is made of the polylactic acid containing resin that has been crystallized after being heated to the crystallization temperature, the hollow article has excellent heat resistance and can be favorably used in applications needed to hold hot water, be heated in a microwave oven, heat treatment for repeated uses, and the like.

Compared with the common resin such as polyethylene, it will need a longer time to cool the polylactic acid containing resin to solidify into a molded article, therefore, the cycle time for the injection-molding is generally longer. However, according to the production process of the present invention, since the polylactic acid containing resin develops thermostability (heat-resistance) through crystallization and can be released from the mold after solidified to some extent, the cycle time can be shortened.

In the production process of the present invention, the infrared temperature sensor can be favorably used as an infrared temperature sensor for receiving infrared rays emitted from a polylactic acid containing resin injected into the cavity by use of an infrared receiver via an optical fiber and detecting the temperature of the resin according to the amount of energy in the infrared rays.

Since the interior of the cavity is dark, there is no other emitting source of infrared rays except the polylactic acid containing resin. Therefore, by use of the infrared temperature sensor, it is possible to detect the temperature of the polylactic acid containing resin in the cavity with high accuracy.

It is preferred that the infrared temperature sensor is disposed at a position facing the cavity capable of detecting the temperature of the polylactic acid containing resin located in the gate. The polylactic acid containing resin located at the exit of the gate has the highest temperature. Therefore, by disposing the infrared temperature sensor at a position facing the cavity capable of detecting the temperature of the polylactic acid containing resin located in the gate, when the temperature T of the polylactic acid containing resin falls in the above-mentioned range, it can be detected certainly, and consequently, the timing for opening the mold can be determined with certainty.

DETAILED DESCRIPTION OF THE PREFERRED EMBODIMENTS

Hereinafter, an embodiment of the present invention will be described in details with reference to the drawings.

Figure 1A:
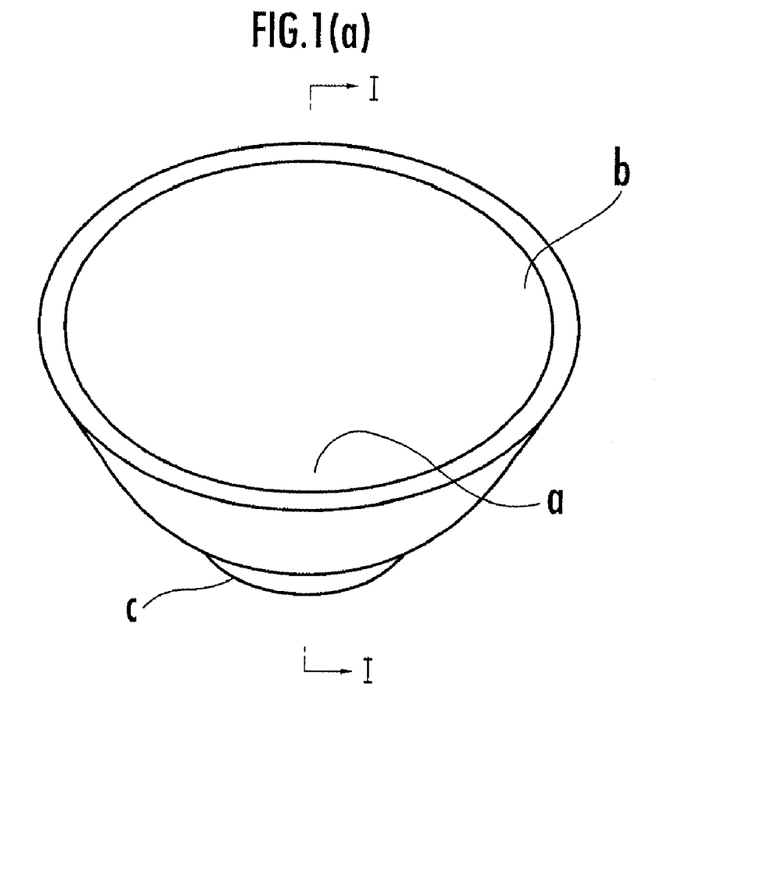
FIG. 1(a) is a perspective view of a hollow article in an embodiment of the present invention.
Figure 1B:
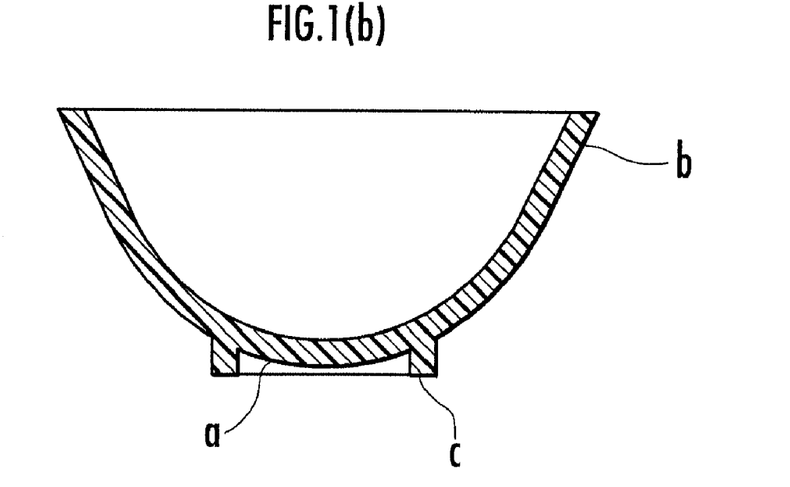
FIG. 1(b) is a sectional view taken along the line I-I of FIG. 1(a)

In this embodiment, a description will be given when a bowl A as shown in FIGS. 1(a) and 1(b) is manufactured as a heat-resistant hollow article by the injection molding of a polylactic acid containing resin.

FIG. 1(a) is a perspective view of the bowl A and FIG. 1(b) is a sectional view taken along the line I-I of FIG. 1(a). As shown in FIGS. 1(a) and 1(b), the bowl A has a bottom portion a and a peripheral wall portion b that is continuous with the bottom portion a and rises from the bottom portion a. The bowl A is provided, in the bottom portion a thereof, with an annular stand portion c that protrudes outward.

Figure 2:
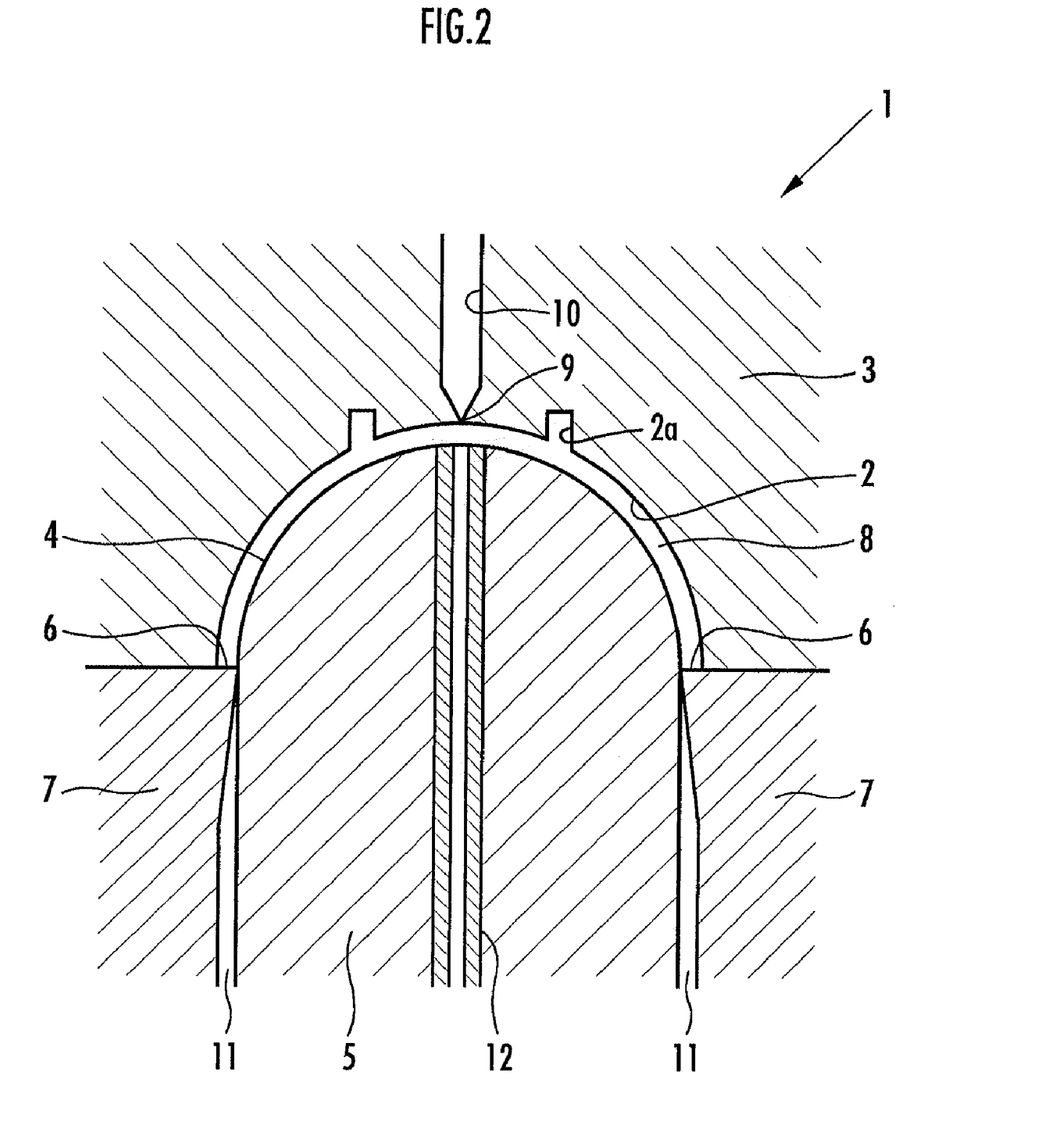
FIG. 2 is an explanatory sectional view that shows the manufacturing process of a hollow article in an embodiment of the present invention.

The bowl A is manufactured by using a mold 1 shown in FIG. 2. As shown in FIG. 2, the mold 1 used in the production process of this embodiment comprises a female mold portion 3 having a concavity 2 of a shape fitting the outer surface of the bowl A, a male mold portion 5 having a convexity 4 fitting the inner surface of the bowl A and opposed to the concavity 2, and a stripper plate 7 which is arranged along the periphery of the male mold portion 5 and has an edge-forming part 6 having a shape fitting an edge of the bowl A. In the mold 1, a cavity 8 enclosed by the concavity 2, the convexity 4 and the edge-forming part 6 is formed. Incidentally, the reference numeral 2a denotes a convexity for forming an annular protruded portion in the bottom portion of the bowl A as the stand portion c.

In the mold 1, the female mold portion 3 is a fixed mold portion and the male mold portion 5 and the stripper plate 7 are movable. The female mold portion 3 has a runner 10 that communicates with the cavity 8 via a gate 9. Between the male mold portion 5 and the stripper plate 7, there is formed a compressed air introduction passage 11 that ejects compressed air along the periphery of the male mold portion 5. And in the convexity 4 of the male mold portion 5, there is disposed an infrared temperature sensor 12 in a position which is opposing to the gate 9 and facing the cavity 8.

Figure 3:
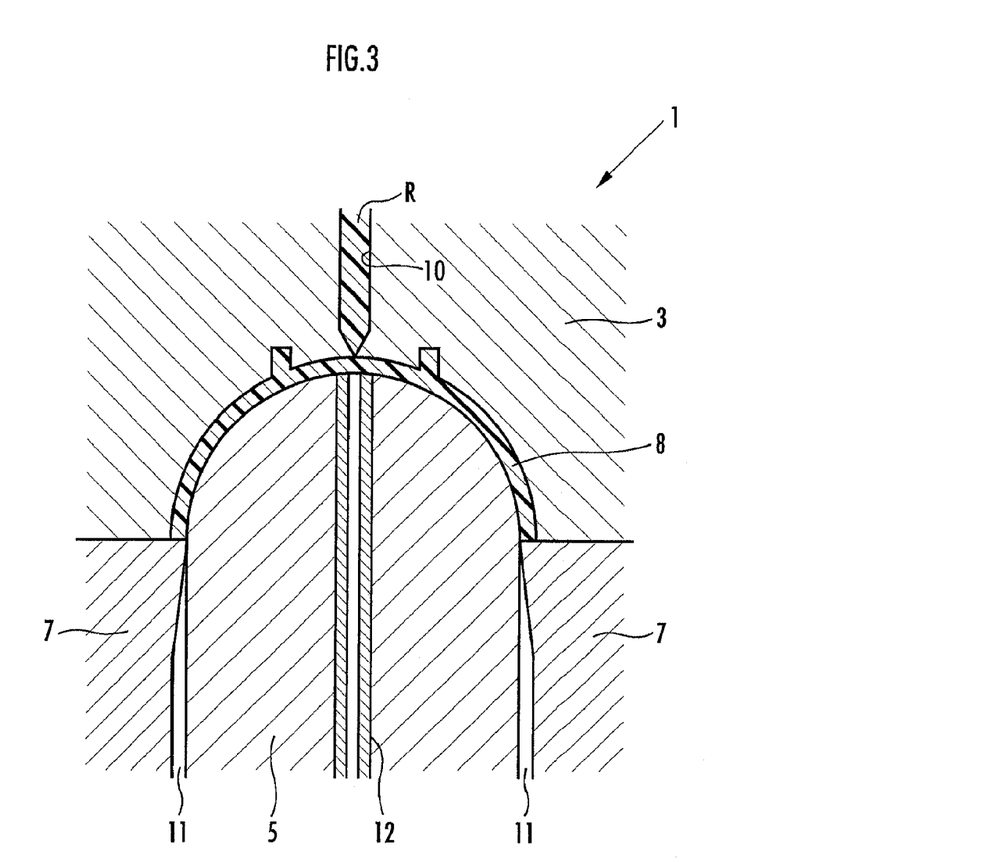
FIG. 3 is an explanatory sectional view that shows the manufacturing process of a hollow article in an embodiment of the present invention.

In the production process of this embodiment, first, the female mold portion 3, the male mold portion 5 and the stripper plate 7 are heated by use of a heating device (not shown) to ensure that the temperature of the surfaces of the concavity 2, convexity 4 and edge-forming part 6 that form the cavity 8 reaches a temperature in the range of 100 to 120° C., for example, 110° C. And as shown in FIG. 3, a polylactic acid containing resin R in a molten state is injected into the cavity 8 via the runner 10.

The polylactic acid containing resin R is a biodegradable resin composition including an inorganic filler of 1~28% by mass and substantially polylactic acid as the left part. The inorganic filler is a nanocomposite. It is preferred that the inorganic filler is a laminated silicate having an average layer thickness from 1 to 100 nm and a major length not greater than 150 nm when observed under a transmission electron microscope. Moreover, the polylactic acid containing resin R may contain the other resins for the purpose of formality regulation; however, the amount of the other resins should be limited in a range not deteriorating the biodegradability. Examples of such polylactic acid containing resin R include TERRAMAC TE-8210 (trade name) made by UNITIKA LTD.

Figure 4:
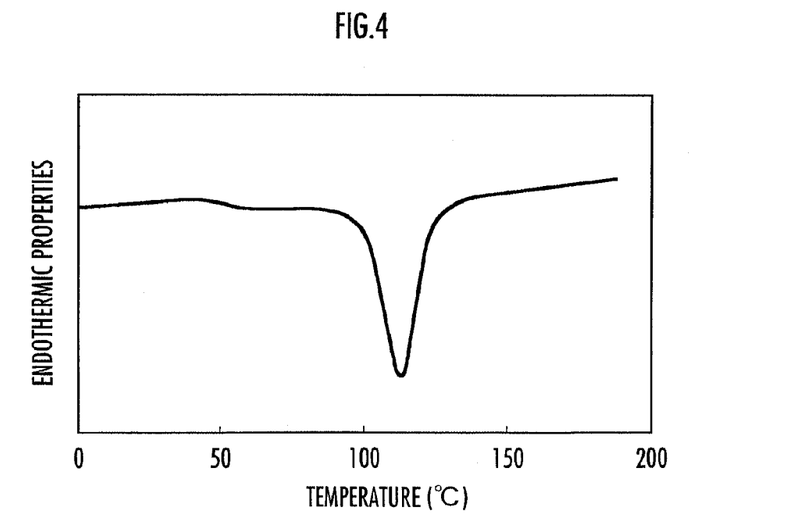
FIG. 4 is a graph that shows the endothermic properties of a polylactic acid containing resin used in the present invention.

As shown in FIG. 4, the polylactic acid containing resin R shows endothermic properties in the range of 95 to 125° C. and the peak temperature thereof is at 110° C. Therefore, the polylactic acid containing resin R crystallizes to solidification after being cooled in the cavity 8 when the temperature thereof is kept in the above-described range of 110 to 120° C. around 110° C., for example, which is the peak temperature for crystallization.

When cooled to solidification in the mold 1, the polylactic acid resin which can produce a sharp crystallization (heat-absorption) curve is only limited to the polylactic acid containing resin R which contains nanocomposite inorganic filler. A polylactic acid containing resin which contains common composite inorganic filler or a common polylactic acid containing resin does not have such a temperature range where a sharp crystallization occurs when cooled to solidification in the mold.

Since the polylactic acid containing resin which contains nanocomposite inorganic filler crystallizes abruptly around 110° C., if it is cooled over a long time around 110° C., the contraction will advance excessively, therefore, the molded article will adhere closely to the mold 1, which makes it difficult to release the molded article from the mold.

When the bowl A has been formed after the solidification of the injected polylactic acid containing resin R, the mold 1 is opened by moving the male mold portion 5 and the stripper plate away from the female mold portion 3. According to the investigations by the inventors of the present invention, when the temperature T(° C.) of the polylactic acid containing resin R is in the temperature range expressed by the following expression, it can be determined that the polylactic acid containing resin R has solidified to form the bowl A, and the bowl A can be released from the male mold portion 5.

$$T=(t+3.5)\pm 1.5$$

(Where: t(° C.) is the surface temperature of the concavity 2, the convexity 4 and the edge-forming part 6 facing the cavity 8)

Specifically, when the surface temperature of the concavity 2, the convexity 4 and the edge-forming part 6 (hereinafter, referred to as "surface temperature of the mold") is 120° C., the temperature T of the polylactic acid containing resin R serving as the determination base is 123.5±1.5; when the surface temperature of the mold is 110° C., the temperature T of the polylactic acid containing resin R is 113.5±1.5. Therefore, the temperature T of the polylactic acid containing resin R is in the temperature range of 125 to 112° C.

As above-mentioned, the polylactic acid containing resin R begins to crystallize at a temperature around 125° C., thus, when the temperature T of the polylactic acid containing resin R is higher than 125° C., the polylactic acid containing resin R is not solidified and the bowl A has not been formed. Further, the peak temperature for the polylactic acid containing resin R to crystallize is 110° C., thus, if the temperature T of the polylactic acid containing resin R is lower than 112° C., the crystallization will progress excessively, which makes it difficult to release the bowl A from the male mold portion 5.

According to the present embodiment, when the surface temperature of the mold is 110° C., the temperature T of the polylactic acid containing resin R serving as the determination base is 113.5±1.5° C. according to the above expression, namely, in the range of 115 to 112° C.

In the present embodiment, the determination on the solidification of the polylactic acid containing resin R and the formation of the bowl A is performed by tracking temporal changes on the temperature of the polylactic acid containing resin R within the cavity 8 by use of the infrared temperature sensor 12. As a result thereof, the mold 1 can be opened as described above when the temperature of the polylactic acid containing resin R falls in an appropriate temperature range.

Figure 5:
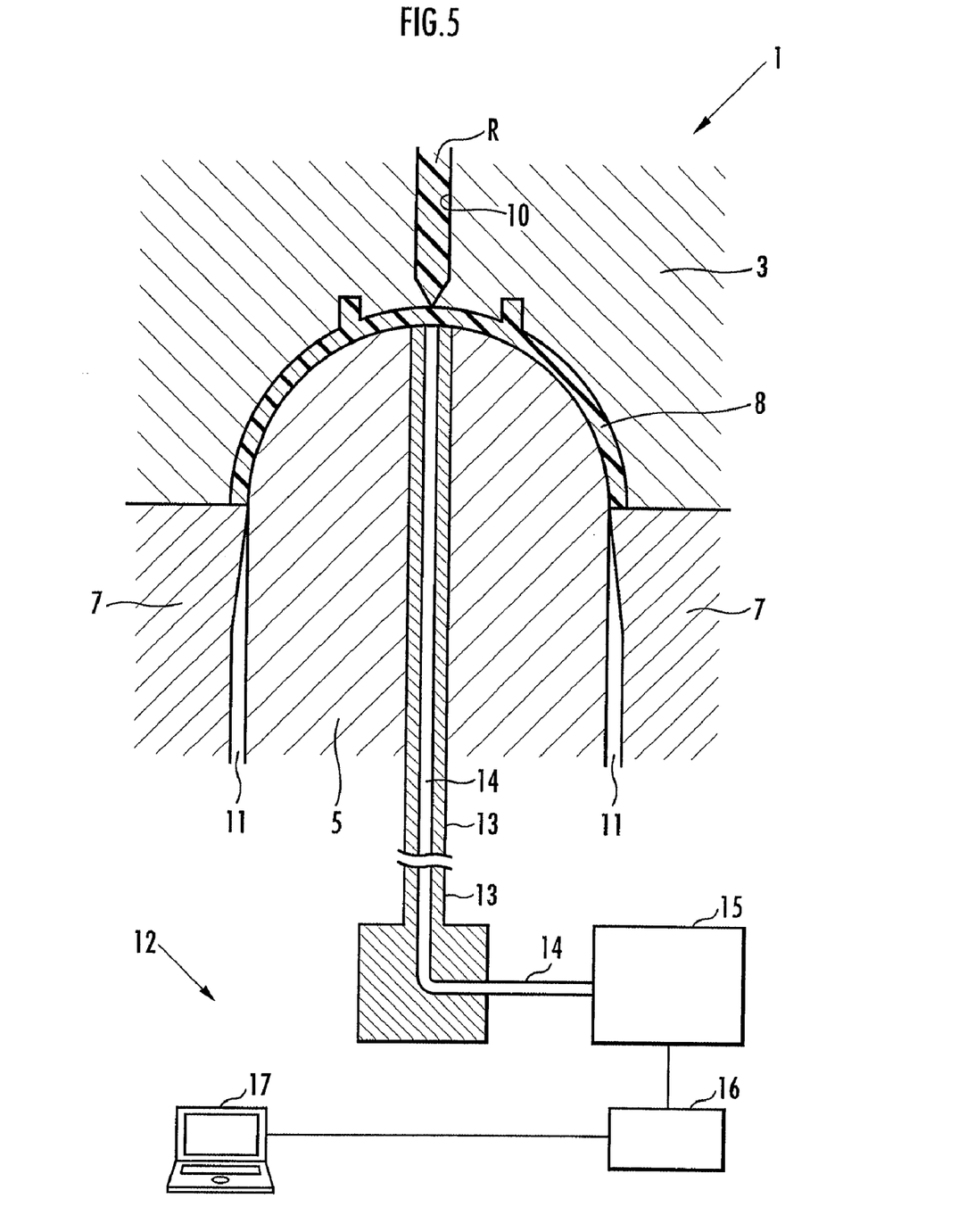
FIG. 5 is a system configuration diagram that shows the construction of an infrared temperature sensor.

As shown in FIG. 5, the infrared temperature sensor 12 has an optical fiber 14 disposed in a steel sleeve 13 made of quenched steel. One end portion of the optical fiber 14 is exposed to the interior of the cavity 8 and the other end portion thereof is connected to an infrared ray sender/receiver 15. And the infrared ray sender/receiver 15 is connected to a temperature sensor 16, and the temperature sensor 16 in turn is connected to a display device 17 such as a personal computer.

Figure 6:
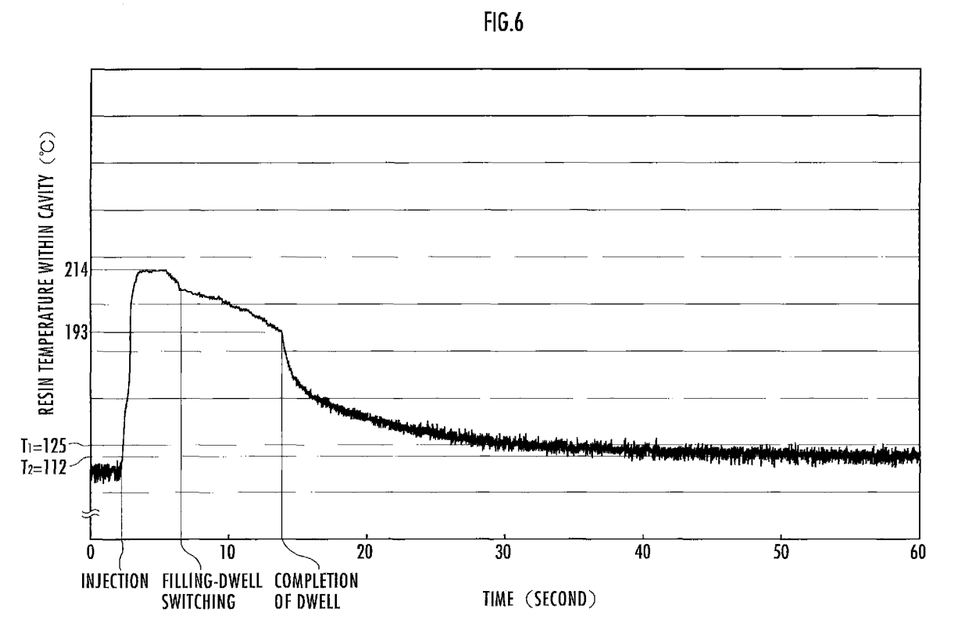
FIG. 6 is a graph that shows changes with time in the temperature of a polylactic acid containing resin within a cavity measured by the infrared temperature sensor shown in FIG. 4.

Infrared rays emitted from the polylactic acid containing resin R injected into the cavity 8 are received by the infrared ray sender/receiver 15 via the optical fiber 14, and the infrared temperature sensor 12 detects the temperature of the polylactic acid containing resin R according to the amount of energy in the infrared rays by performing a prescribed arithmetic process in the temperature detector 16. The temperature of the polylactic acid containing resin R detected by use of the temperature detector 16 is displayed by the display device 17. FIG. 6 shows an example of temporal changes on the temperature of the polylactic acid containing resin R within the cavity 8 measured by the infrared temperature sensor 12.

As shown in FIG. 6, the temperature of the polylactic acid containing resin R within the cavity 8 is the highest (the temperature is 214° C. in one embodiment) immediately after injection and drops slowly from filling-dwell switching to the completion of dwell (the temperature is 193° C. in one embodiment). Immediately after the completion of dwell, the temperature of the polylactic acid containing resin R drops temporarily steeply, but after that, the temperature drops slowly again. FIG. 6 shows how the temperature of the polylactic acid containing resin R within the cavity 8 becomes the temperature $T_1$ (125° C.) at which thermostability is developed in the polylactic acid containing resin R and how the temperature of the polylactic acid containing resin R within the cavity 8 drops further and becomes the temperature $T_2$ (112° C.) at which the bowl A cannot be released from the mold. From FIG. 6, it is apparent that the difference between the temperature $T_1$ and the temperature $T_2$ is very small and that it is difficult to appropriately grasp an appropriate temperature range for opening the mold 1 when indirect measurements from the temperature of the mold 1 are made.

Owning to the infrared temperature sensor 12 according to the present embodiment, it is possible to determine that the polylactic acid containing resin R within the cavity 8 has been solidified when the temperature of the polylactic acid containing resin R within cavity 8 is in the range of 125 to 112° C. corresponding to the temperature $T_1$ and the temperature $T_2$, preferably 115 to 112° C., the bowl A has been formed and can be released from the male mold portion 5, thereby, the mold 1 can be opened as described above.

The temperature reduction control for the polylactic acid containing resin R can be performed by using either one of an electric heater, warm water and oil, or a combination thereof.

According to the present embodiment, when the temperature of the polylactic acid containing resin R in the cavity 8 reaches 112° C., the mold 1 is opened. It is determined that the temperature of the polylactic acid containing resin R in the cavity 8 has been 112° C. when an average temperature of the temperatures determined by the infrared sensor 12 in a predefined short time (for example, 0.05 seconds) firstly reaches 112° C. The elapse time for the temperature of the polylactic acid containing resin R in the cavity 8 to reach 125° C. or 112° C. varies according to the thickness of the bowl A, the filling pressure of the polylactic acid containing resin R, the temperature where the polylactic acid containing resin R is being filled, the temperature control capability of the mold 1 such as the thermodynamic properties of the heater or the heat insulting fluid, ingredient amount of the nanocomposite in the polylactic acid containing resin R, and the like.

Figure 7:
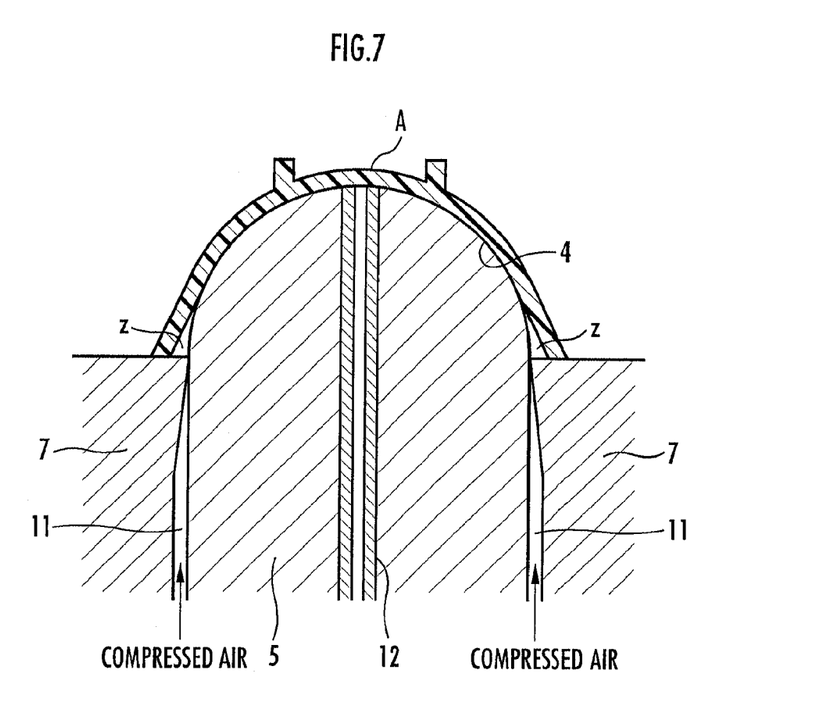
FIG. 7 is an explanatory sectional view that shows the manufacturing process of food containers in an embodiment of the present invention.

When the mold 1 is opened by moving the male mold portion 5 and the stripper plate 7 away from the female mold portion 3, the polylactic acid containing resin R has been contracted in association with solidification. Therefore, the bowl A, although releasable, adheres to the male mold portion 5. As a result thereof, as shown in FIG. 7, the bowl A cannot be easily released from the male mold portion 5 although the bowl A can be easily released from the female mold portion 3. Thus, the bowl A is released from the female mold portion 3 while adhered to the male mold portion 5.

If the bowl A is left adhering to the male mold portion 5, the bowl A will adhere to the male mold portion 5 more and more strongly as the above-described contraction proceeds. Therefore, compressed air is introduced through the compressed air introduction passage 11 into between the inner surface of the solidified bowl A and the convexity 4 of the male mold portion 5, whereby the inner surface of the bowl A is released from the convexity 4. The compressed air introduction passage 11 may be opened along the full circumference of the peripheral edge of the male mold portion 5 or may be also opened partially in several places at the peripheral edge of the male mold portion 5. As a result thereof, a clearance Z is formed between the bowl A and the convexity 4 and the bowl A rises a little from the convexity 4. However, the bowl A still remains unremoved from the convexity 4. The pressure of the compressed air may be regulated in an appropriate range which will not deform the bowl A or cause the bowl A swollen according to the weight, thickness or the like of the bowl A, for example, from 0.05 Mpa to 1.0 MPa.

Figure 8:
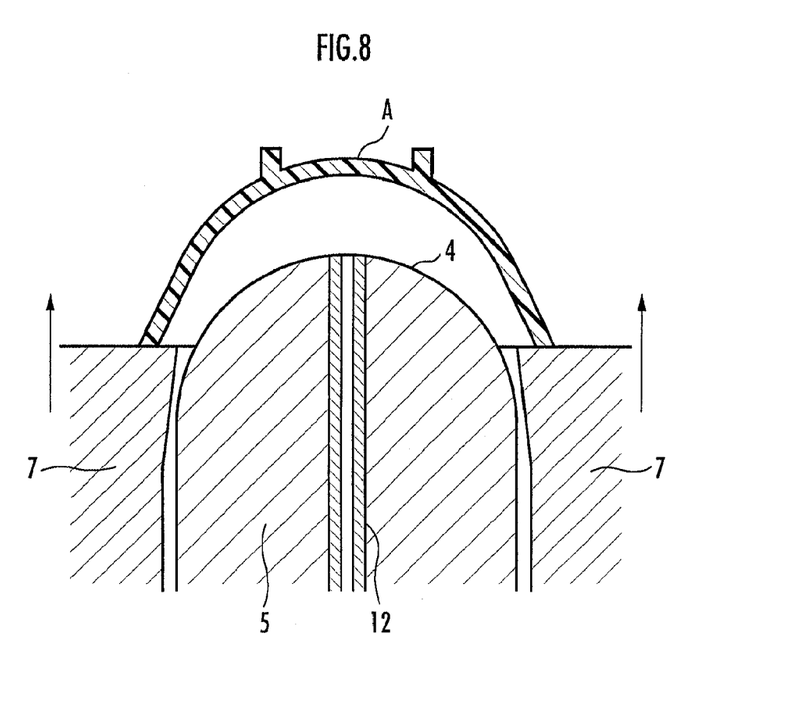
FIG. 8 is an explanatory sectional view that shows the manufacturing process of food containers in an embodiment of the present invention.

Thereafter, as shown in FIG. 8, the bowl A is taken out of the mold 1 by advancing the stripper plate 7 toward the bowl A. As described above, after the bowl A has been released from the convexity 4, and the stripper plate 7 lifts the edge of the bowl A by use of the edge-forming part 6 that abuts against this edge. Therefore, it is easy to take out the bowl A from the male mold portion 5.

Since the bowl A obtained by the production process of the present embodiment is made of the crystallized polylactic acid containing resin R, the bowl A is thermostable and can be used as a container for food to be heated by hot water and a microwave oven. And since the bowl A has heat resistance, it is possible to perform cleaning, drying and sterilization treatment at high temperatures, and the bowl A can be used as the so-called returnable containers that can be recycled after use.

Compared with the common resin such as polyethylene, it will need a longer time to cool the polylactic acid containing resin R to solidify into a molded article, therefore, the cycle time for the injection-molding is generally longer. However, according to the production process of the present invention, the bowl A can be released from the mold after the polylactic acid containing resin R has developed the thermostability and solidified to such strength that it will not be deformed by the external force from the stripper plate 7 while the compressed air is ejected. Accordingly, the cycle time can be shortened.

If the mold 1 is opened as aforementioned when the temperature T of the polylactic acid containing resin R in the cavity 8 is higher than 125° C., for example, at 130° C., the bowl A will deform like the bellow of an accordion due to the compression stress of the stripper plate 7. In addition, if the pressure of the compressed air is too high, the bowl A will swell like a balloon. The reason is considered to be the insufficient rigidity of the bowl A due to insufficiently developed crystallization in the surface of the bowl A.

On the other hand, if the mold 1 is opened as aforementioned when the temperature T of the polylactic acid containing resin R in the cavity 8 is lower than 112° C., for example at 110° C., the bowl A adheres closely to the male mold portion 5 due to the contraction, which makes the bowl A impossible to be released or deform when being released from the mold.

In the present embodiment, the description was given when the bowl A is manufactured as the above-described hollow article. The above-described hollow article may be of any kind so long as it is a hollow article capable of being molded by injection molding, for example, tableware, such as bowls and cups, cosmetic containers, such as lipstick containers, chemicals containers, caps of containers, beverage bottles (except PET bottles formed by blow molding), sealable containers, such as Tupperware (trade mark), food packing containers for microwave oven, and heat-resistant containers for electronic device.

In the present embodiment, the description was given of the bowl A having the annular stand portion c. However, a bowl A without the annular stand portion c may also be used.

In the present embodiment, the infrared temperature sensor 12 is disposed in the convexity 4 of the male mold portion 5. It is acceptable to dispose the infrared temperature sensor 12 at any position where the temperature of the polylactic acid containing resin R at the exit of the gate 9 can be detected, or in the concavity 2 of the female mold portion 3.

What is claimed is:

1. A process for production of a heat-resistant hollow article made of a polylactic acid containing resin molded by injecting the polylactic acid containing resin into a mold, wherein the polylactic acid containing resin is a biodegradable resin composition which contains not less than 50% polylactic acid by mass and 1 to 28% nanocomposite inorganic filler by mass, and wherein the mold comprises a female mold portion having a concavity of a shape fitting an outer surface of the hollow article, a male mold portion having a convexity fitting an inner surface of the hollow article and opposed to the concavity, and a stripper plate having an edge-forming part which is arranged along the periphery of the male mold portion and which has a shape fitting an edge of the hollow article, the mold being configured to form a cavity enclosed by the concavity, the convexity, and the edge-forming part, the process comprising the steps of:

heating the surface of the mold facing the cavity to a temperature in the range of 110 to 120° C. which corresponds to a crystallization temperature of the polylactic acid containing resin;

injecting the polylactic acid containing resin in a molten state into the cavity of the mold heated to the crystallization temperature via a gate disposed in the mold;

moving the male mold portion and the stripper plate away from the female mold portion when a temperature T (°

C.) of the polylactic acid containing resin injected into the cavity which is detected by an infrared temperature sensor provided in a position which is housed in the convexity of the male mold portion or in the concavity of the female mold portion and is facing the cavity is in a range expressed by $T=(t+3.5)\pm1.5$ where t (° C.) is the surface temperature of the mold facing the cavity;

releasing the inner surface of the hollow article from the convexity of the male mold portion by injecting and introducing compressed air through a compressed air introduction passage formed between the male mold portion and the stripper plate into between the inner surface of the solidified hollow article and the convexity of the male mold portion; and taking out the hollow article from the mold by advancing the stripper plate toward the hollow article.

2. The process according to claim 1, wherein the inorganic filler is a laminated silicate having an average layer thickness from 1 to 100 nm and a major length not greater than 150 nm when the laminated silicate is observed under a transmission electron microscope.

3. The process according to claim 1, wherein the male mold portion and the stripper plate are moved away from the female mold portion when the temperature T of the polylactic acid containing resin detected by the infrared temperature sensor is in the range of 125 to 112° C.

4. The process according to claim 1, wherein the male mold portion and the stripper plate are moved away from the female mold portion when the temperature T of the polylactic acid containing resin detected by the infrared temperature sensor is in the range of 115 to 112° C.

5. The process according to claim 1, wherein the infrared temperature sensor receives infrared rays emitted from the polylactic acid containing resin injected into the cavity by use of an infrared receiver through an optical fiber and detects the temperature of the resin according to an amount of energy in the infrared rays.

6. The process according to claim 1, wherein the infrared temperature sensor is disposed at a position which is opposing to the gate portion and facing the cavity.

* * * * *

UNITED STATES PATENT AND TRADEMARK OFFICE
CERTIFICATE OF CORRECTION

PATENT NO. : 8,309,010 B2  
APPLICATION NO. : 12/709430  
DATED : November 13, 2012  
INVENTOR(S) : Michio Komatsu et al.

Page 1 of 1

It is certified that error appears in the above-identified patent and that said Letters Patent is hereby corrected as shown below:

Title Page, Item (76) Inventors: "Toshikatsu Matsuoka" should read --Toshitaka Matsuoka--.

Signed and Sealed this
Twelfth Day of February, 2013

Teresa Stanek Rea
*Acting Director of the United States Patent and Trademark Office*